(12) United States Patent
Gallistel

(10) Patent No.: US 8,307,652 B1
(45) Date of Patent: Nov. 13, 2012

(54) HETERODYNE TRANSMISSION

(76) Inventor: Tony Gallistel, South Haven, MN (US)

( * ) Notice: Subject to any disclaimer, the term of this patent is extended or adjusted under 35 U.S.C. 154(b) by 718 days.

(21) Appl. No.: 12/483,744

(22) Filed: Jun. 12, 2009

Related U.S. Application Data

(60) Provisional application No. 61/092,742, filed on Aug. 28, 2008.

(51) Int. Cl.
F03G 7/00 (2006.01)
F16H 3/74 (2006.01)

(52) U.S. Cl. .......................... 60/721; 475/255

(58) Field of Classification Search .............. 60/721; 74/20–110; 415/916; 475/255; 290/1 R
See application file for complete search history.

(56) References Cited

U.S. PATENT DOCUMENTS

| 3,625,089 A | 12/1971 | Rutkove | |
|---|---|---|---|
| 4,070,855 A | 1/1978 | Lund | |
| 5,667,038 A * | 9/1997 | Tarnopolsky | 185/27 |
| 5,921,133 A | 7/1999 | Tarnopolsky | |
| 6,237,342 B1 | 5/2001 | Hurford | |
| 6,363,804 B1 | 4/2002 | Tarnopolsky | |
| 6,601,471 B2 | 8/2003 | Tarnopolsky et al. | |
| 6,694,844 B2 | 2/2004 | Love | |

FOREIGN PATENT DOCUMENTS

| DE | 4329964 A1 | 10/1994 |
|---|---|---|
| FR | 2570442 A1 | 3/1986 |
| FR | 2624562 A1 | 6/1989 |
| FR | 2644850 A1 | 9/1989 |
| GB | 2040018 A | 8/1980 |
| GB | 2299648 A | 9/1996 |
| WO | WO 8204174 A1 | 12/1982 |
| WO | WO 9222746 A1 | 12/1992 |
| WO | WO 9603735 A1 | 2/1996 |
| WO | WO 9612891 A1 | 5/1996 |
| WO | WO 9710433 A1 | 3/1997 |
| WO | WO 02070893 A1 | 9/2002 |
| WO | WO 2004007956 A1 | 1/2004 |

* cited by examiner

Primary Examiner — Thomas Denion
Assistant Examiner — Christopher Jetton
(74) Attorney, Agent, or Firm — Albert W. Watkins

(57) ABSTRACT

A heterodyne motor weight motor that uses at least a centripetal acceleration to selectively increase or decrease rotational speed or power. The heterodyne comprises a central rotary body and at least one orbital body revolving about said central rotary body. The orbital body additionally rotates about an orbital body axis, and carries at least one or preferably a plurality of rotating eccentric masses.

14 Claims, 11 Drawing Sheets

Offset Orbit

— Center Motions ···· Axle Motions — Origin

Motion of Eccentric Center of Mass

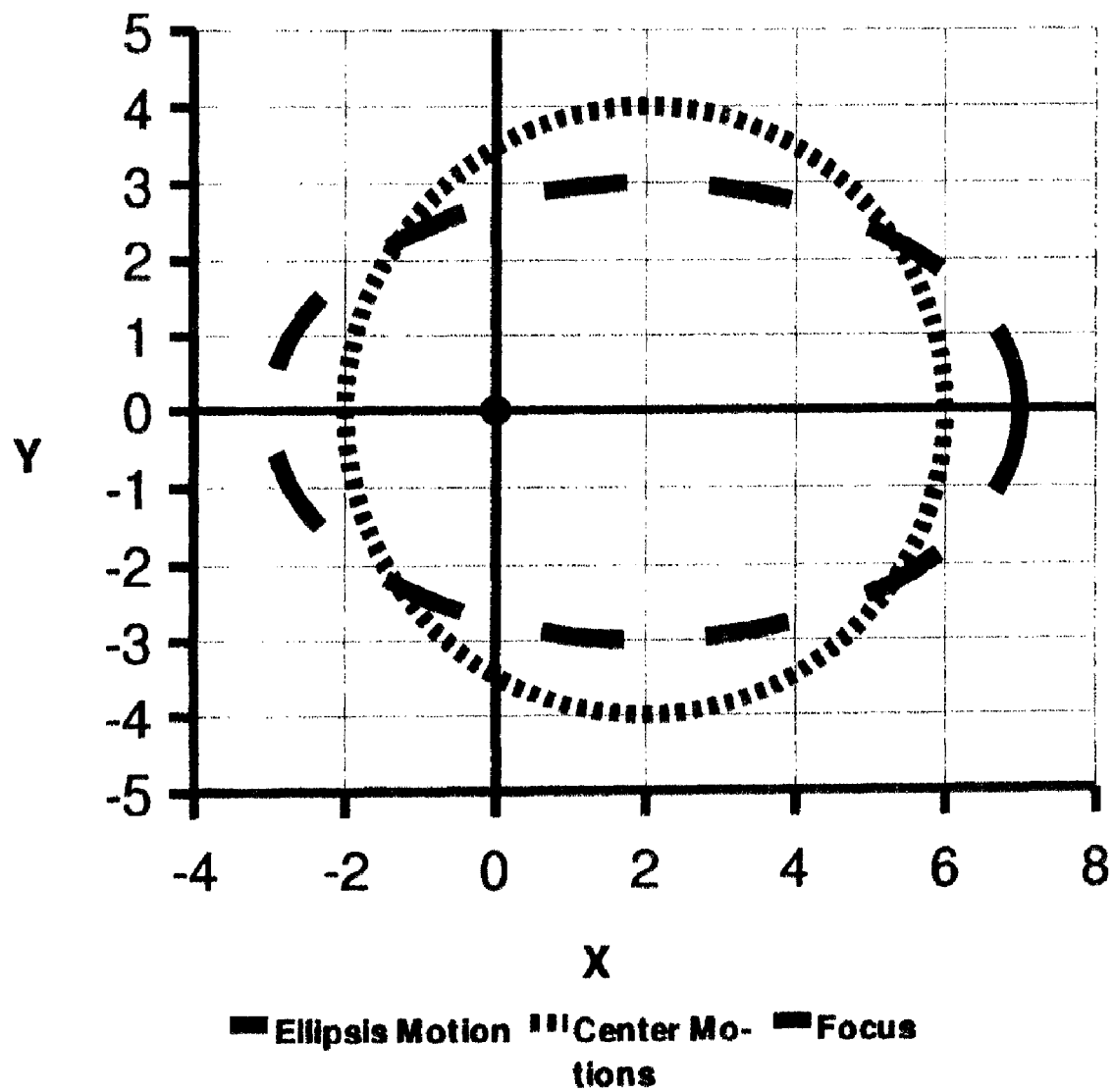

HETERODYNE TRANSMISSION

CROSS REFERENCE TO RELATED APPLICATIONS

This application claims priority to the U.S. Provisional Application Ser. No. 61/092,742 entitled "Heterodyne Mechanical Means," filed Aug. 28, 2008 and naming the present inventor, the entire contents which are incorporated herein by reference.

BACKGROUND OF THE INVENTION

1. Field of the Invention

This invention pertains generally to motors, and more particularly to weight-type motors. In various manifestations, the invention may be applied to diverse systems and devices for much benefit.

2. Description of the Related Art

Humans for all of recorded time have pursued ways to improve living conditions and quality of life. The development of the modern industrial world has occurred in no small measure due to evolution in the design and development of motors and generators that are able to use or produce power, which may in turn be applied to a particular task. Of particular interest to the present invention are those that are generally referred to as weight motors, which operate from unbalanced forces typically acting about a common center of rotation. Some early versions of these motors and generators were operated using the weight of water falling preferentially on only one side of a wheel, leading to an unbalanced condition and resultant rotation. More recent weight motors have been developed that incorporate specially configured weights and gearing systems. Exemplary of these, the contents of each which are incorporated herein by reference, are French published patent application 2,570,442 by Marcy, entitled "Self-propelled motor"; PCT published application WO 92/22,746 by Hatazawa, entitled "Gravity Prime Mover"; U.S. Pat. No. 5,921,133 by Tarnopolsky, entitled "System and method of conversion of gravitation into mechanical energy by means of a sequence of impulses of force"; and U.S. Pat. No. 6,363,804 by Tarnopolsky, entitled "System and method for conversion of gravity into mechanical energy using two sub-systems". These patents each illustrate various mechanisms for moving weights about a central axis or center of rotation, and changing the orientation of the weights during such mechanical motion. While each of these patents illustrate interesting and related apparatus and systems, the present invention seeks to improve upon the teachings found therein.

Webster's New Universal Unabridged Dictionary, Second Edition copyright 1983, is additionally incorporated herein by reference in entirety for the definitions of words and terms used herein.

SUMMARY OF THE INVENTION

In a first manifestation, the invention is an improved heterodyne mechanical motor.

In a second manifestation, the invention is a manually controlled heterodyne mechanical motor or brake.

OBJECTS OF THE INVENTION

Exemplary embodiments of the present invention solve inadequacies of the prior art by providing novel apparatus for the generation of unbalanced conditions, and further providing novel apparatus for manually adjusting the degree of unbalance, so the means is responsive either to variation in either load or rotational velocity.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 8 compares the unbalanced lever arm of an offset circle with that of an ellipse of equal area.

DESCRIPTION OF THE PREFERRED EMBODIMENT

Manifested in the preferred embodiments, the present invention provides a mechanical dynamo of novel construction, utilizing centripetal acceleration or gravitational acceleration. Further embodiments illustrate selectively increasing or decreasing speed, power or torque preferably in a regulated, selectable, controllable manner.

In the motor or brake in accord with the present invention, at least one acceleration acts upon a plurality of eccentric masses similar to those illustrated, for exemplary purposes only and not limited solely thereto, in Tarnopolsky and the other references incorporated herein above. These masses have a rotational center determined by their axle being journaled in bearing means and an inertial center of mass offset from their rotational center. There thus exists a vector "r" which has an origin on the rotational centerline and passes through the inertial center of said eccentric masses. Any acceleration which acts upon the corpus of the mass acts as if there is a force acting on the inertia center of said mass. As the inertial center of the eccentric mass is offset from its rotational axis any acceleration which is normal to vector r acting upon the corpus of the mass creates a torque about the rotational axis of the mass. The force acts according to the well know relation F=ma and the torque according to the relation Torque=r×F.

In the preferred embodiments of the present invention, for each rotation of the heterodyne body each eccentric mass makes a counter revolution driven by a transmission mechanism. Therefor in the heterodyne body the axles of the individual eccentric masses move with uniform circular motion of radius "R" about the central axis of the heterodyne body while their inertia centers also scribe a uniform circle about that axis but, one that is radially offset the distance "r" from the path scribed by their axles.

The transmission mechanism or mechanisms of the preferred embodiments of this invention act to regulate the eccentric masses' orientation such that their mutual orientation vector "r" is substantially continuously maintained at some angle theta. Theta=0 is understood to directly opposed to or 180 degrees from the vector of any net acceleration external to the heterodyne body acting on the eccentric masses inertial centers.

During normal operations, the eccentric masses orbit about the heterodyne body central axle while the synchronizing or throttling mechanism, or mechanisms acts to continuously maintain a substantially fixed orientation, theta, of the masses.

Figure 6:
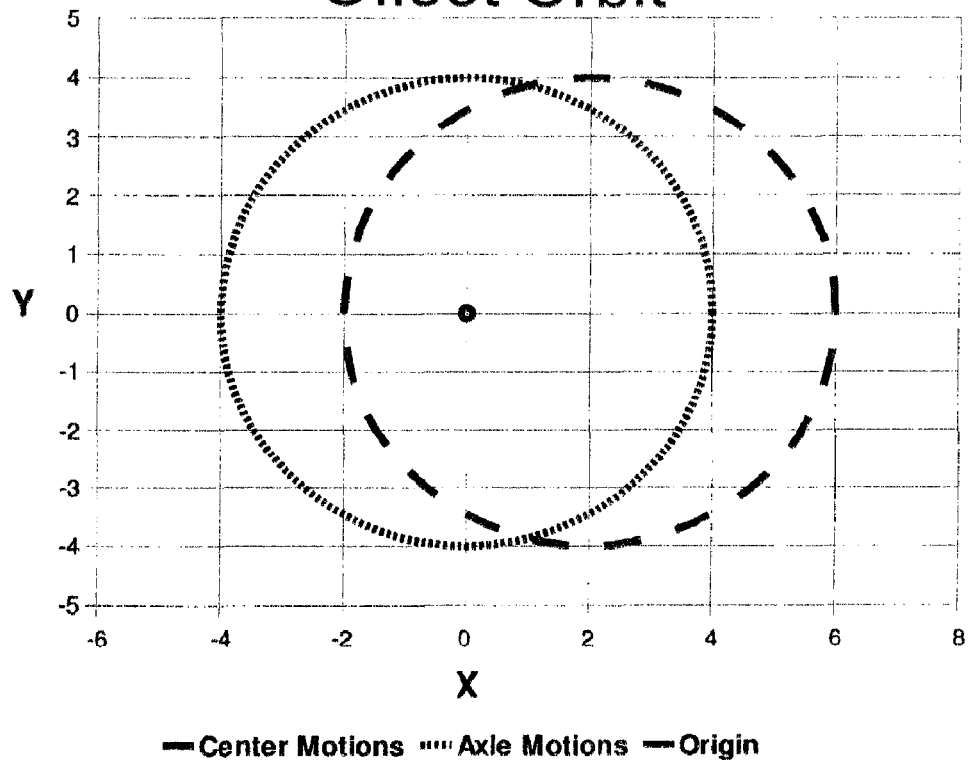
FIG. 6 illustrates a coordinate system centered on the heterodyne bodies rotational axis and showing the offset motion of the inertial centers of the eccentric masses.

When theta=90 degrees there exists a coordinate system in which the XY plane is coplanar with the heterodyne bodies' rotation and the Z axis of the coordinate system is coaxial with the heterodyne bodies' rotational axis. In this system, the inertial centers of the individual eccentric masses will be seen to oscillate sinuously in Y from substantially plus R to minus R according to the equations for uniform circular motion, while in X the inertial centers oscillate sinuously from (−R+r) to (R+r). For an illustration of this coordinate system please see FIG. 6.

Figure 7:
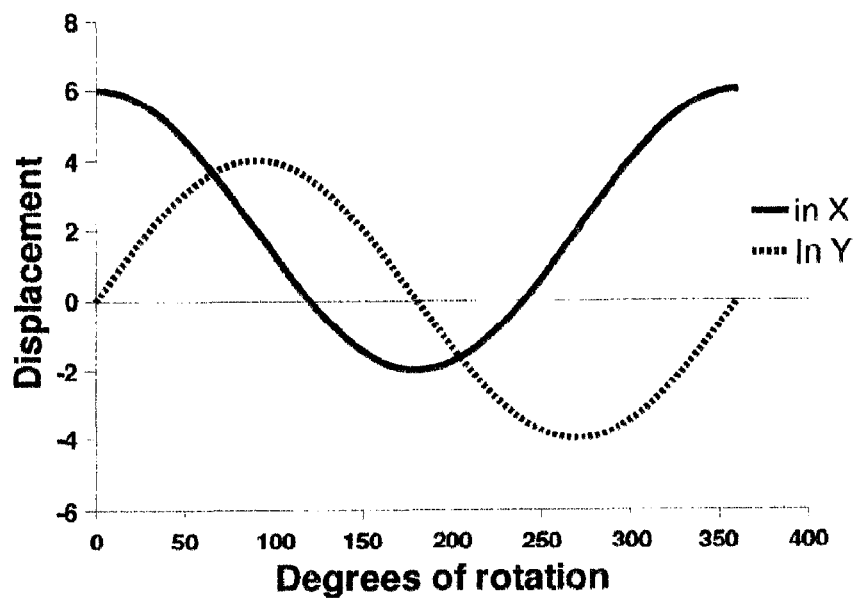
FIG. 7 describes the unbalanced lever arms developed by this system which give rise to the unbalanced forces which cause a heterodyne effect.

Thus it can be seen that, while the mass of the eccentric is constant, and the acceleration acting on the inertial center of the masses is constant, the lever arm, or mechanical advantage, for an individual mass under these conditions is variable. When the lever arm is longest at R+r, the torque on the rotor is greater than when lever arm is least at R−r. Since there are typically a plurality of eccentric masses journaled about the periphery of the heterodyne body which is rotating there are always masses entering the region of greater leverage and equivalent opposite masses entering the region of least mechanical advantage. Under these conditions an unbalanced net torque about the heterodyne bodies' central axis is created and continuously maintained. For an illustration of the differential lever arms of this means please see FIG. 7.

In the preferred embodiments this unbalanced net torque creates two opposed effects. One is a static force acting through the mechanism of the synchronizing, regulating, or throttling transmission and the other is a dynamic torque acting upon the heterodyne body through the eccentric masses' axle and axle bearings.

For a given embodiment of this invention, when the orientation of the masses theta is such that this torque acts to increase the speed or power of the rotor's rotation, the heterodyne is deemed to be a positive or motor heterodyne and when this torque acts to decrease the speed or power of the rotor's rotation, the heterodyne is deemed to be negative or brake heterodyne.

For a given embodiment of this invention, if the orientation of theta is such that there is a positive or motoring heterodyne, then this continuous torque strongly tends to increase the rotational rate of the body until a combination of either friction, drag, power generation or other mechanical load factors counteracts this torque or until a material failure occurs and parts of the mechanism are launched along random tangential vectors with potentially lethal effects. For this reason, amongst others, it is greatly preferable that the throttling or synchronizing mechanism of these means selectively control the eccentric masses' orientation vector through substantially plus or minus 90 degrees of arc angle in relation to any acceleration vector. Configured in this manner, the heterodyne can selectively and controllably act as either a motor or a brake, and a high degree of dynamic control is achieved.

On first consideration, it might seem that the vector orientation of the eccentric masses directly in line with any acceleration acting upon them would be equivalent to the previously stated, preferred, opposed orientation. This is not the case, because there is another heterodyne effect present within the operation of this mechanism. Copernicus made extensive observations of planetary orbital motions which Kepler later refined into a mathematic relationship know as Kepler's Laws of Orbital Motion. This work was later developed by Sir Isaac Newton as a corollary to his general theories of universal gravitational force. While this same data is arguably better explained by Einstein's theories of space-time curvature the important point is that Kepler was able to determine from Copernicus' data that orbital bodies sweep equal areas in equal periods of time and Sir Isaac Newton was able to determine mathematically that this relation of arc radius which varies over time for elliptical orbits and arc angle which varies inversely with the arc radius conserves the inertia or momentum of the orbital body.

It has been previously stated and illustrated herein that the motion of the eccentric masses' inertial centers with respect to the heterodyne body's central axis is an offset circle, none the less, there are similarities between this offset uniform circular motion and a true elliptical orbit. FIG. 8 illustrates an offset circular orbit and an ellipse of the equal areas.

In order to conserve momentum about the central axis the eccentric masses would like to speed up as they nearly pass the rotational center at R−r and slow down when they are most distant from said center at R+r. The synchronous gearing of the regulating mechanism prevents this, so a complex transfer of momentum between the masses and the heterodyne body occurs instead. In this transfer the eccentric mass gains momentum when it is forced by the drive to move too fast according to Kepler's Law in the R+r region of its motion and lose momentum in the R−r region when it is forced to move too slowly.

Due to variation in the mechanical advantage of the lever arm in these regions, the drive forces the mass to increase its momentum when the drive has the mechanical advantage and to decrease its momentum when the mass has the mechanical advantage. This effect is solely dependent upon the amount of the mass, the differential radii, and the rate of rotation. For a given mechanism, the first quantities are fixed and the last, the rate of rotation varies dynamically. This inertial heterodyne effect is closely related to centrifugal force which appears to arise from the action of centripetal acceleration and like centripetal acceleration, this internal heterodyne effect increases as the square of the angular velocity. So, at slower revolutions there is an orientation of theta in which any external acceleration acting on the eccentric masses which acts as a brake or negative heterodyne along with ordinary friction and drag will exactly balance this positive conservation of momentum heterodyne effect. However, there is equally, a greater RPM, at which the conservation of momentum heterodyne effect becomes dominant and completely overcomes any braking heterodyne, friction or drag such that the mechanism unless it is somehow restrained will uncontrollably accelerate to the point of self destruction.

For this reason it is generally preferable that theta=0 be taken as that orientation of the eccentric masses 180 degrees opposed to any external acceleration. However, this orientation creates some problems for the throttling control mechanism in that the throttle must do work upon the system to change from a throttling orientation to a neutral or braking orientation. Whereas, if the orientation directly in line with the centripetal acceleration is taken to be nearly theta=0, the revolutions are kept moderate and the throttling means is slightly biased in the direction of braking. Then the throttle must do work upon the system in order to cause an increase in torque and will, left to itself, tend to naturally return to a near zero heterodyne orientation, so there are some significant benefits to this configuration as well.

A requirement for a functional transmission mechanism common to all preferred embodiments of these means is that it substantially continuously maintain the orientation theta of the eccentric masses to some degree normal to any external acceleration acting upon them as they rotate about the center of a heterodyne body. There are a number of mechanical transmissions that can serve this limited purpose. However, as just discussed, it is greatly preferable that the transmission also selectively, controllably, and dynamically change the orientation of the eccentric masses as they orbit the heterodyne body's central axle so that the type and degree of heterodyne effect can be selectively controlled.

In plain language, the first requirement of regulating drive train mechanism is that it substantially continuously maintain the vector orientation of each eccentric mass counter to the rotation of any rotation in the heterodyne body. Preferably while the throttling drive train simultaneously works to selectively and controllably vary the angle theta of this orientation vector through maximally up to plus or minus 180 degrees of arc angle, but preferably through only the approximately plus or minus 90 degrees of arc angle that dynamically changes theta from least heterodyne to either maximum braking or maximum motoring heterodyne.

In gear train terms this is expressed as W(mass)=−W(body) where W(body) is the angular rotation rate of the orbital body and W(mass) is the angular rotation rate of any eccentric mass. Preferably this equation may also include a term +/−theta where theta is a phase angle increment for throttling, thus the preferred form of the transmission equation is;

$$W(body) = -W(mass) +/- theta.$$

For preferred embodiments of this invention which utilize orbital heterodyne bodies the rotational rate of the orbital body is theoretically independent of the rotational rate of the central or "sun" rotor. As a practical mater the need to utilize synchronous drive means to regulate and throttle the orientation of the eccentric masses continuously maintaining their orientation theta fixed in relationship with the centrifugal effect caused by the rotation of the main rotor means that the angular rate of rotation for all three bodies, the sun rotor, the orbital body rotor, and the eccentric masses must be synchronized.

Typically it is highly preferable that at least one of the drive trains used to synchronize or throttle the heterodyne terminate in a drive member that is substantially fixed, or anchored, in the stationary reference frame and that it still be able to control the orientation vector theta of the individual eccentrics as they rotate about their own axles and simultaneously in orbit in at least one additional rotary frame of reference and preferably in two rotary frames of reference for a set of orbital bodies which utilize the centripetal acceleration of a main rotor to drive a heterodyne.

Figure 1:
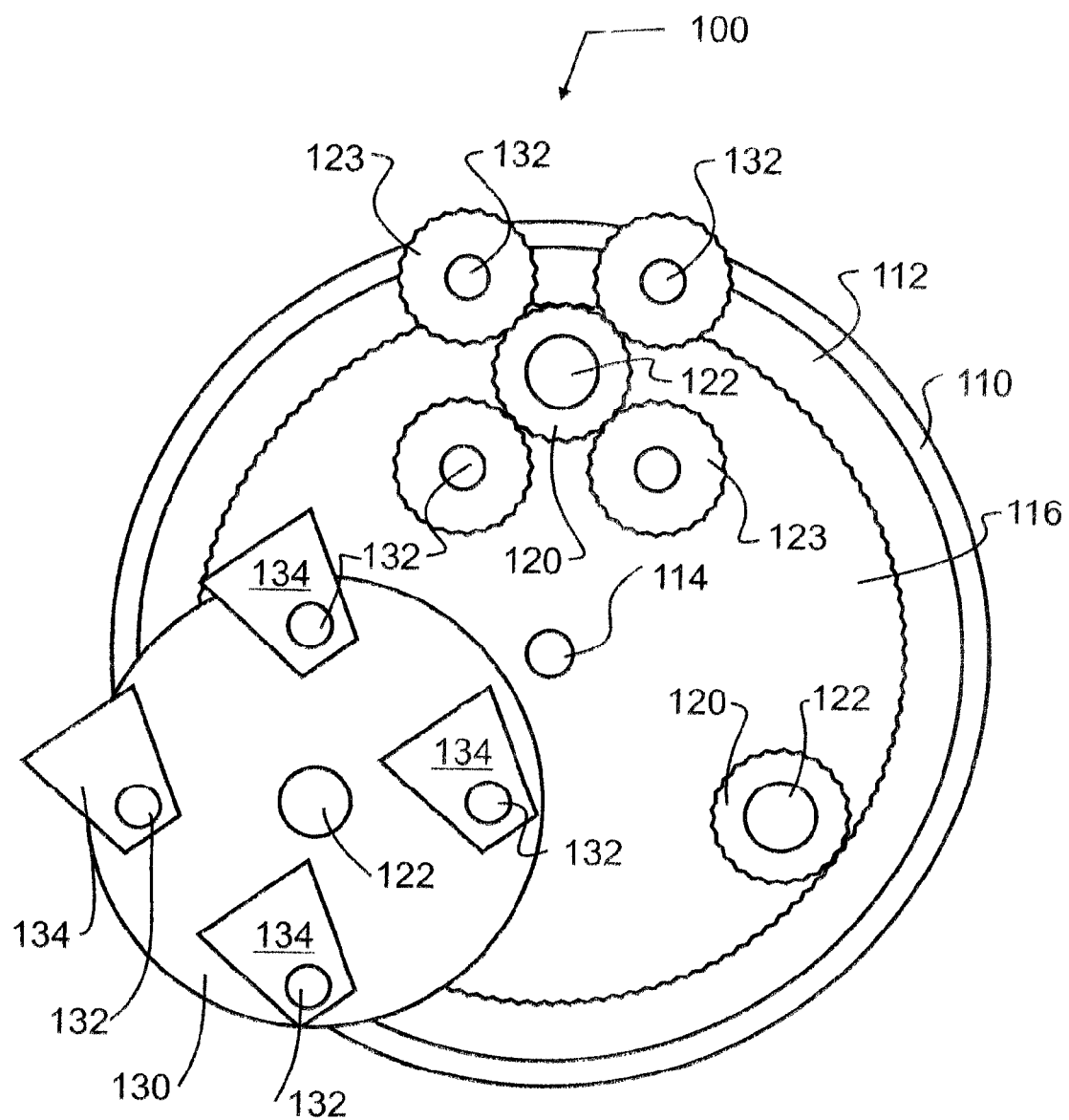
FIG. 1 illustrates a preferred embodiment heterodyne mechanical motor by a partial assembly view.

FIG. 1 illustrates a preferred embodiment heterodyne mechanical motor 100 by a partial assembly view. A plurality of masses 134 rotate about axles 132 offset from the inertial center of the masses 134. These masses 134 are therefor substantially eccentric to the rotational axis 132. The eccentric masses 134 simultaneously orbit about an axle 122 integral with or rigidly connected to a crank, crank plate set, or orbital body plate set 130, wherein the eccentric mass axle 122 is journaled. Simultaneously the eccentric masses 134 also orbit central axle 114 journaled in the motor housing.

From the fixed frame of reference if axles 132 does not rotate in its bearing while simultaneously 122 does not rotate in its bearings while simultaneously the entire assembly depicted in FIG. 1 makes one revolution about axle 114 then, from the fixed frame of reference, eccentric masses 134 have all made an orbit comprising one revolution.

Again from the fixed frame of reference, if axle 132 does not rotate, while axle 122 makes one revolution, and simultaneously axle 114 does not rotate then in the fixed frame of reference masses 134 have all made an orbit comprising one revolution. The orbital revolution described in this paragraph is distinct from that described in the preceding paragraph in that the orbital radius in the later case is smaller than in the first case while the first orbital revolution is centered on and occurs about axle 114 while in the second case the orbital revolution is centered on and occurs about axle 122.

Finally, again from the fixed frame of reference, if a mass 134 rotates about its own axle 132 while simultaneously neither axle 114 or 122 rotates then mass 134 makes one revolution. Thus it can be seen and understood that from the fixed frame of reference the rotation of mass 134 is the sum of its individual and orbital revolutions.

Further, axle 114 may be in bearings and so freely rotate, axle 122 may also be in bearings and so freely rotate, while axle 132 may be in bearings and so freely rotate. Therefor, to regulate and constrain the revolutions of masses 134 as they rotate about 132 and orbit about 122 and 114 a gear train comprised of gear 123 rigidly connected with axle 132 with meshing with gear 120 and the further meshing of gear 120 with internal ring gear 112 which is substantially fixed in the stationary frame of reference exampled by the motor mounts or housing. The role of cluster gear 120 is atypical in that it is not rigidly connected to axle 122 being instead journaled in bearings and rotating about axle 122.

The embodiment of FIG. 1 supports the synchronous counter rotation of the eccentric mass or masses 134 relative to the rotation of the crank, crank plate set, or orbital body plate set 130 due to the combined actions of the crank, crank plate set, or orbital body plate set 130 rotation, and the substantially fixed orientation of the internal ring gear 112. However, it does not determine the rotation of axle 122 or plate 130 substantially comprising the end view of an orbital body, nor the rotation of axle 114 and plate 116 substantially comprising the end view of a central rotor. These rotations are preferably determined by other means not shown in FIG. 1 and it is the interaction of those other means and these herein described and illustrated in FIG. 1 that completely determine, regulate and preferably also throttle the heterodyne effects of this invention.

The terms crank, crank plate set, rotor plate set, or orbital body plate set, can typically be used interchangeably throughout the descriptions of these preferred embodiments. The term crank refers to a peripheral axle offset from a central axle having no continuous connection of the central axle to itself, the central axle for exemplary purposes being instead comprised of a pair of stub axles integral with or rigidly connected to at least one peripheral axle. Cranks permit greater amounts of eccentric offset due to the lack of any interference of the central axle and the offset mass. Crank plates refer to typically flat round plates joined to a central axle stub or stubs comprising a central axle and typically journaling several peripheral axles in bearings or bushings equidistant about the periphery of the crank plates. The lack of a unitary axle through the center of the heterodyne body can create problems with plate alignment and structural integrity for heterodyne bodies made with crank plates.

Figure 2:
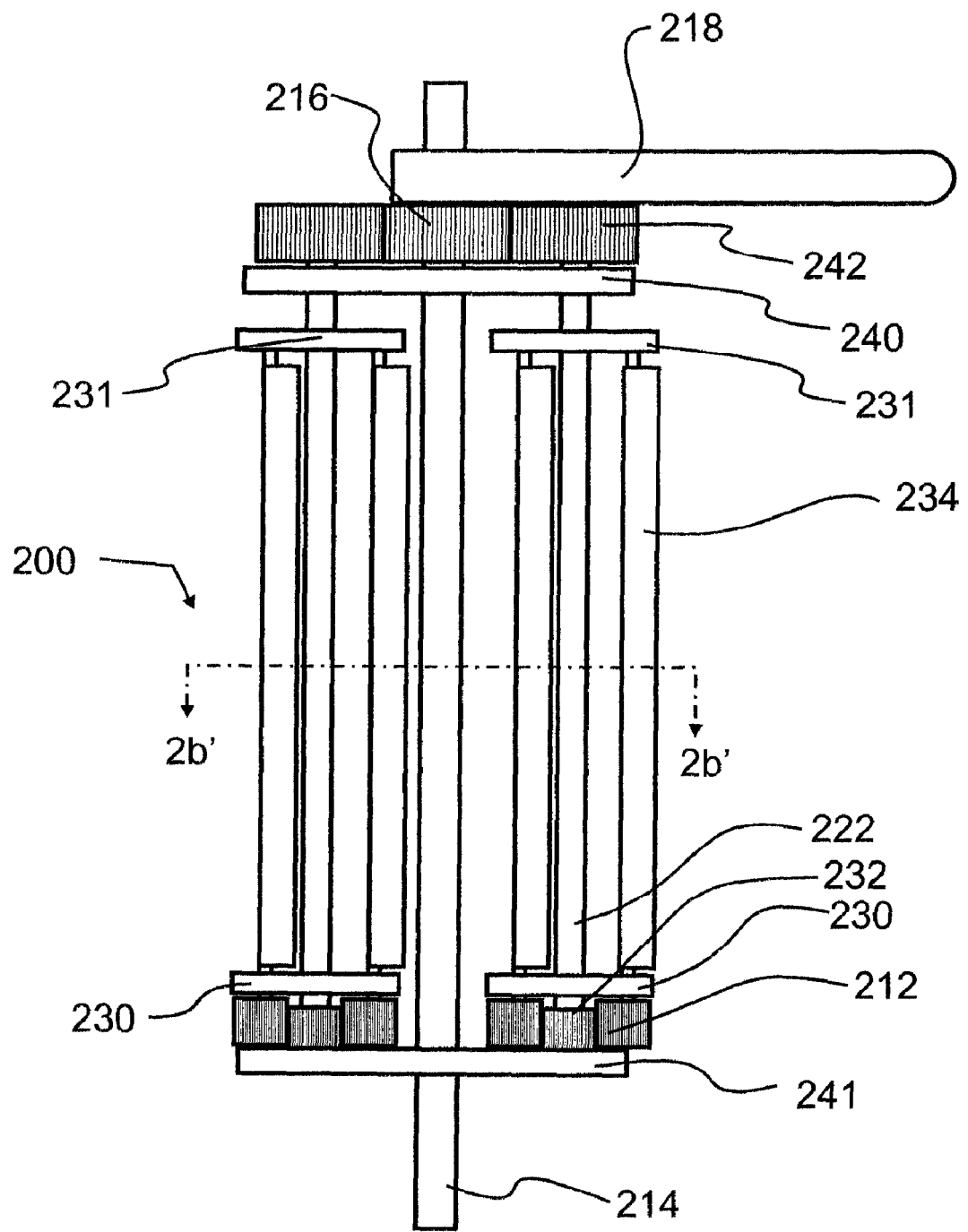
FIG. 2 illustrates a preferred embodiment manually regulated heterodyne mechanical motor and further incorporating components similar to those of FIG. 1.
Figure 2A:
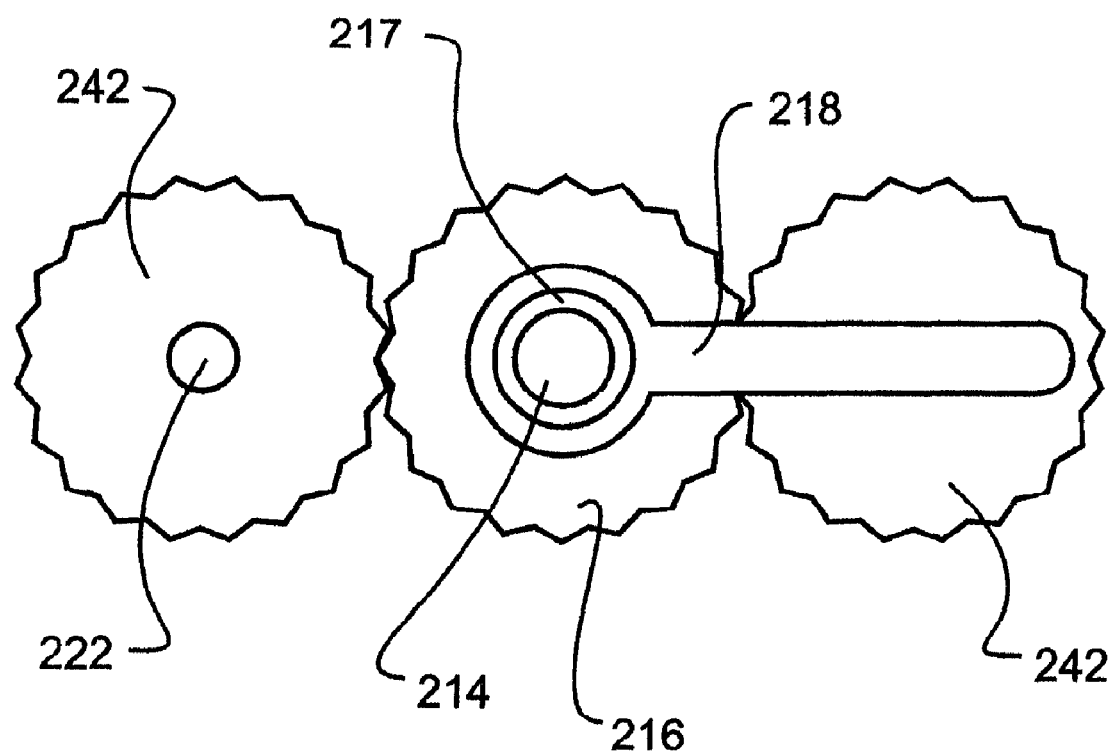
FIG. 2a illustrates select components of the preferred embodiment manually regulated heterodyne mechanical motor of FIG. 2 from top view.
Figure 2B:
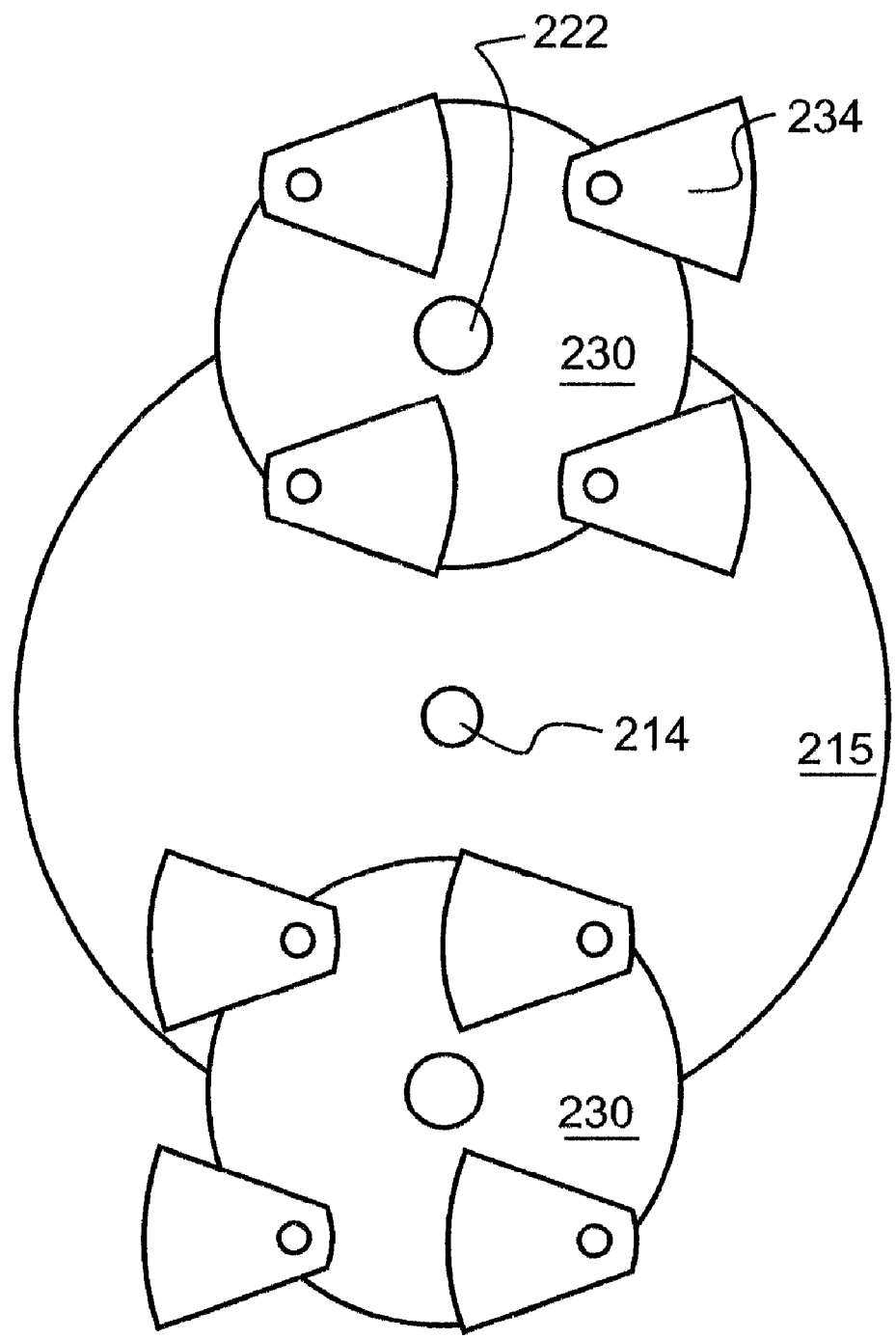
FIG. 2b illustrates the preferred embodiment manually regulated heterodyne mechanical motor of FIG. 2 by sectional view taken along line 2b'.

One means of addressing these issues is for a heterodyne body to be made as illustrated in FIG. 2 with two crank plates 230, 231 and one complete-unitary axle 222 to instead have two stub axles that protrude from plates 230 and 231 respectively and having also a unitary housing that mechanically and structurally joins crank plates 230, 231 and encompasses the eccentric masses 234.

The term orbital body refers to a heterodyne body journaled in bearings near the periphery of a main rotor such as might be defined for exemplary purposes by plate 240 and plate 241, each of which are rigidly coupled to rotate in unison with shaft 214.

If the rotating eccentric masses 234 are kept as nearly adjacent to a crank arm, or one of the crank plates such as 230, or 231 as is possible then the axial torque or torsion they exert on their bearings due to the axial displacement can be kept quite small. Similarly, if two sets of eccentric masses are mounted on an axle between themselves journaled near the periphery of a crank, single crank plate, or single orbital body plate, then the axial torsion of the one eccentric may substantially or completely offsets the axial torsion of the one on the other side of said plate or crank. In either of these instances it may be preferable to use a single crank or single rotary plate to journal the bearings of the eccentric masses. In this case the term crank plate or orbital body plate could be substituted for the terms crank plate set or orbital body set.

The use of orbital body configurations facilitates the design and construction of mechanical heterodyne motors or brakes that have excellent dynamic balance and drive trains that are completely deterministic and controllable which can be controlled from internal ring gears external to the rotor or from spur type gears journaled about the central axle of the rotor. This type of design favors higher rotational speeds which produce greater torques for a given total motor mass.

FIG. 1 gives an end-on view of three orbital bodies journaled in bearings or bushing substantially equally spaced about the periphery of a rotor. The rotor is typically comprised of an axle 114 typically transfixing a matched pair or set of rotor plates 116 having bearings journaling the axles of three orbital bodies substantially comprised of an axle 122 transfixing a single or matched pair of orbital body plates 130 having bearings journaling the axles 132 of four eccentric masses 134. FIG. 1 only depicts one of the three orbital bodies and four of the eccentric masses, and in the upper portion thereof shows the internal synchronous drive, but without any throttling mechanisms because the intent of the figure is to depict only these essential components in relation to their frames of reference.

The orientation of masses 134 is then in part determined by the orientation of their axles 132 having rigidly attached spur type gear 123 meshing with spur type gear 120 journaled on bearings about axle 122, said spur type gear 120 also meshing with internal ring type gear 112. Internal ring type gear 112 is then typically connected to a non-drive component in the fixed frame of reference such as the motor housing or motor base.

FIG. 2 depicts a preferred embodiment of the present invention in which a multiplicity of eccentric masses 234 are journaled in bearings equidistant and near the periphery of a pair of orbital body plates 230, 231, which are transfixed by and rigidly connected to axle 222. Axles 222 in turn are journaled in bearings equidistant about and near the periphery of plates 240, 241 each which is transfixed by and rigidly coupled with central axle 214. Each orbital body is substantially comprised of axle 222 transfixing plates 230, and 231 and eccentric masses 234. The counter rotation of eccentric masses relative to the central rotor are substantially determined by gears or sprockets such as 212, which engage with gears such as 232 that may be in this embodiment rigidly affixed to plate 241 and which may surround bearings that retain axle 222. In this embodiment the counter rotation of eccentric masses is substantially determined by gear 212 attached to the masses 234 meshing with gear 232 which is fixed in the frame of reference of the rotor by being rigidly attached to plate 241. In this embodiment the at most plus or minus 180 degrees of arc angle rotation of the eccentric masses is determined by rotation of throttle handle 218 connected to central gear 216 journaled about axle 214 and meshing with spur type gear 242 which is rigidly connected to or integral with orbital body axle shaft 222.

Within the present disclosure, like numbering of the tens and ones digits will be understood to indicate similarity of structure or function, while the hundreds digit indicates differing embodiments. So, for exemplary purposes, plate 340 of machine 300 is similar in structure and function to plate 240, though slightly different in structural details. In particular, since plate 240 is at the end of machine 300, shafts 222 are not required to pass entirely through. Where not otherwise detailed herein, these slight differences will be apparent and within the level of ordinary skill in this field, and so to save additional writings, will not separately be described herein.

Thus FIG. 1 partially illustrates a type of throttling in which a throttle acts upon the eccentric masses while FIG. 2 more fully illustrates a pair of drive trains that fully regulate the rotation of both the eccentric masses and the orbital bodies in such a way that the fixed train regulates the masses and the variable train regulates the orbit bodies.

This orientation is determined to be W(body)=−W (mass)+/−theta, so that if the main rotor defined by central axle 214 and rigidly affixed plates 240, and 241 makes one revolution in the clockwise direction, and the orbital body rotating about axle 222 makes three revolutions in that direction, then the masses 234 must simultaneously make four counter revolutions when regulated from the fixed frame of reference as in this frame of reference the revolutions of the orbital body are the sum of the individual rotations W(body)+W(rotor). Similarly, if the main rotor makes one revolution in the clockwise direction and the orbital body makes 3 counter revolutions, then the eccentrics 234 must make just two counter revolutions in the fixed frame of reference in order to remain substantially fixed with respect to their orientation to the main rotors' radial rotation vector and the centrifuge effect.

Since this type of translation between orbital, rotational and fixed frames of reference is uncommon I include an example that is part of everyone's common experience. The moon orbits the Earth. The moon always faces the Earth. From the Earth's frame of reference the moon does not rotate. The Earth and moon mutually orbit the sun. The moon always presents a different face to the sun. From the sun's frame of reference the moon does rotate. It also appears to oscillates as it orbits because it is also orbiting the earth.

This is just like the eccentric masses which always show substantially the same face to the rotor central axis. This principle is important as far as correct gearing is concerned in that the rotations of an orbital body or an eccentric mass caused by an orbital rotation must be accounted for just as if it was an ordinary rotation about its own axis if a throttling or regulating mechanism is to properly operate upon the eccentric masses or the orbital bodies from the fixed frame of reference.

Those skilled in the art of epicyclic gearing design and analysis will also recognize similarities between the means of this invention and planetary gearing.

In this embodiment, relatively small net angular motions between gears 232 fixed to plate 241 and regulating the rotation of the eccentric masses and throttle gear 216 rigidly attached to throttle handle 218 regulating the rotation of the orbital bodies will cause synchronized changes in the orientation of the individual eccentric masses such that a greater or lessor degree of heterodyne in either a motoring or braking aspect is achieved. The theta=0, zero heterodyne orientation of said eccentric masses has their eccentric vectors mutually substantially anti-parallel to the radial vector of the main rotor that also passes through the central axis of that orbital body and thus are continuously pointed inward substantially toward the main rotor's central axis which orientation minimizes the torque this centrifugal effect has when it acts upon eccentricity masses 234.

Figure 3:
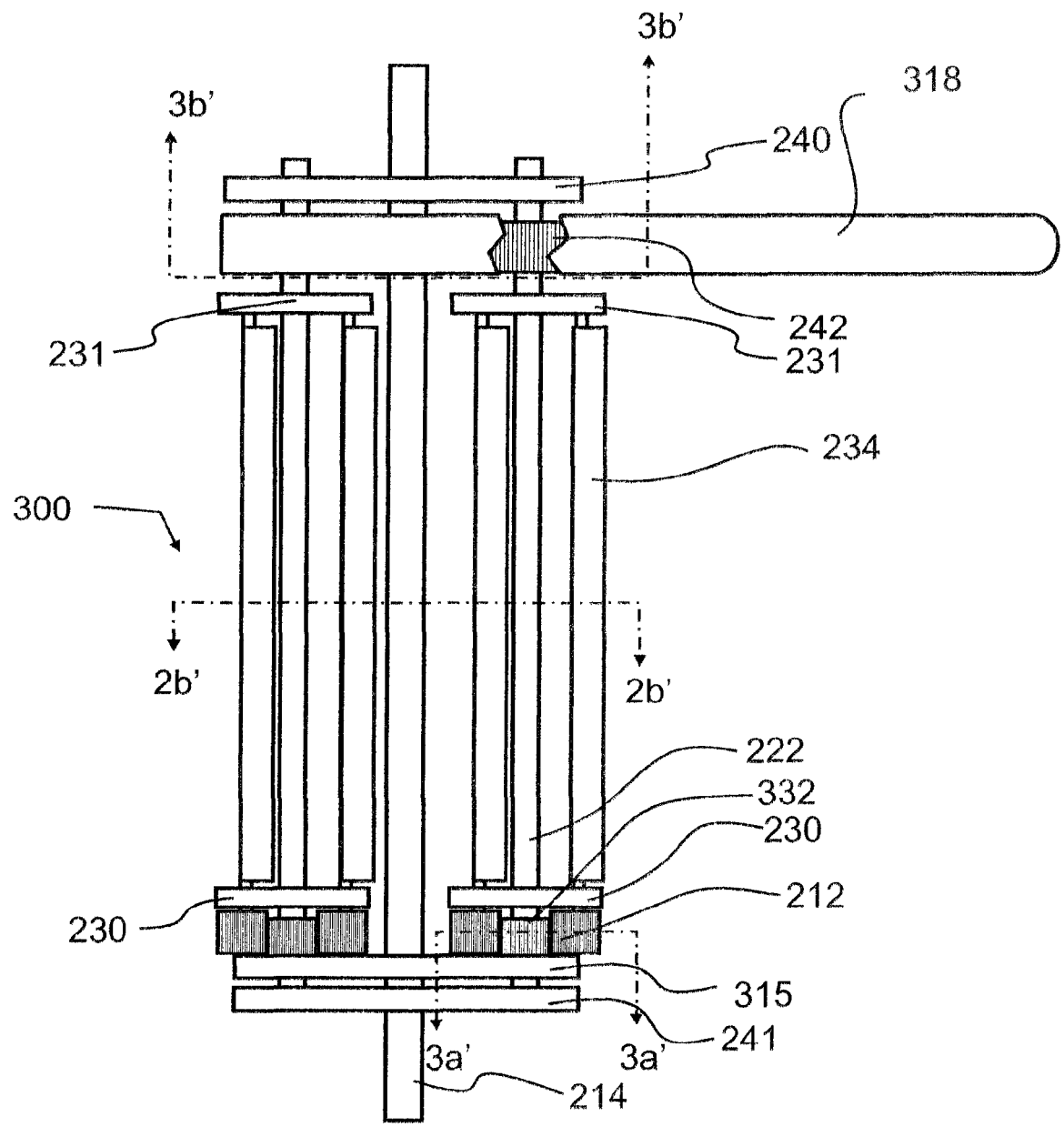
FIG. 3 illustrates an alternative embodiment of a manually regulated heterodyne mechanical motor from side elevational view.
Figure 3A:
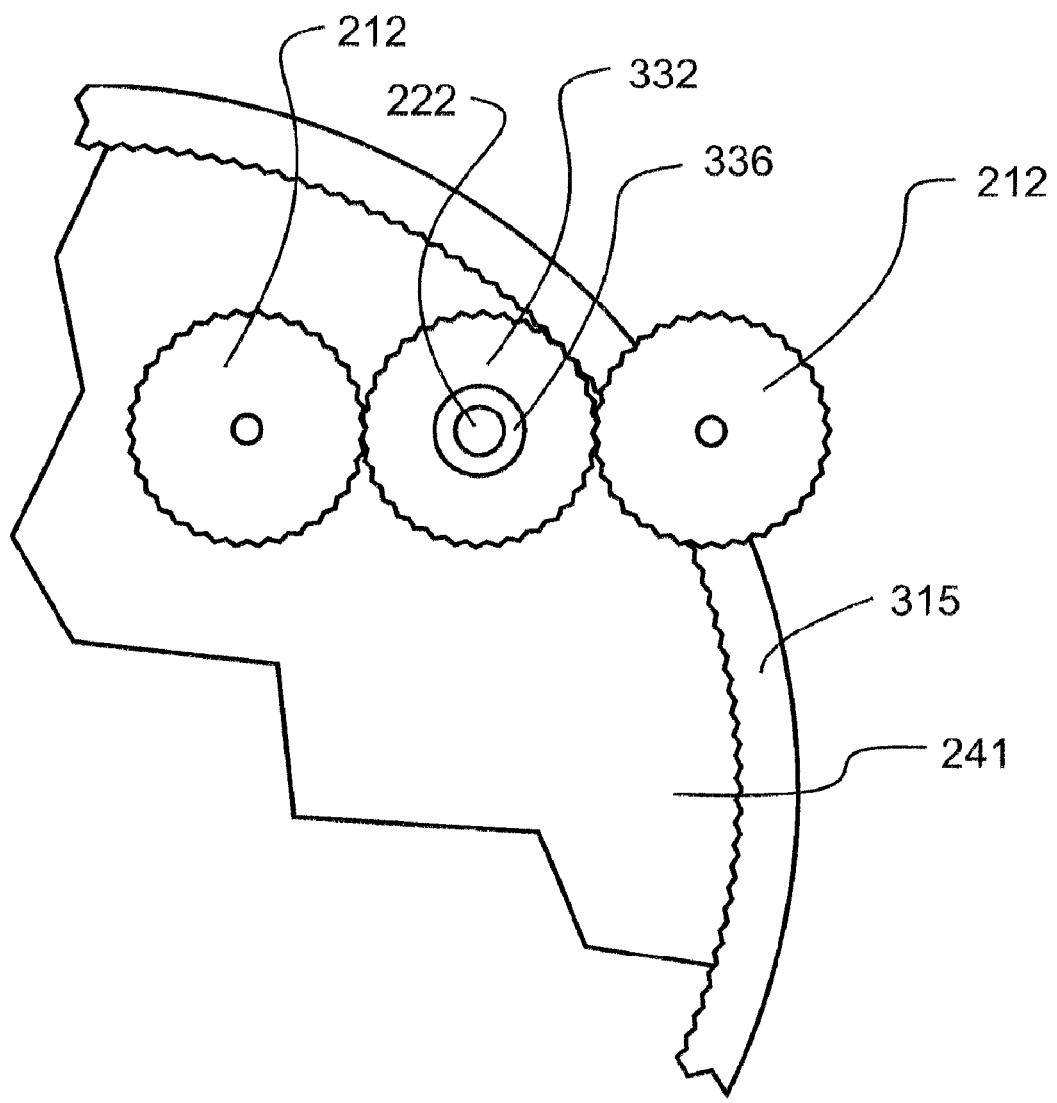
FIG. 3a illustrates the lower gear section of an alternative embodiment of a manually regulated heterodyne mechanical motor of FIG. 3 by partial sectional view taken along line 3a'.

An alternative arrangement illustrated in FIG. 3, details a pair of internal ring gears 315 and 318, with ring gear 315 anchored such as with respect to earth or an exterior housing, and allowing ring gear 318 to be selectably rotated relative thereto. In FIG. 3, internal ring gear 318 has a handle that is used to change the orientation vector of the plurality of eccentric masses.

Another alternative arrangement based on the precepts illustrated in FIG. 3 is one in which the pair of ring gears 315 and 318 that regulate and throttle the heterodyne effects of this invention are coupled to the load on the motor and a throttling mechanism respectively. In this arrangement, these encompassing internal ring gears, previously described as being substantially fixed with respect to the rotation of the rotor are made to rotate more or less freely with the rotation of the rotor. Since differential rotation between these two ring gears controls the type and amount of heterodyne by means of this arrangement the type and degree of heterodyne can be made responsive to dynamic changes in the load, the throttle, or both by simply restraining or dynamically braking one ring gear, the other, or both.

The particular benefit of this arrangement is in the realization of a heterodyne mechanism that when combined with appropriate control means tends to maintain a specific speed with a variable torque output that is none the less responsive to changing load conditions or an arrangement in which the heterodyne torque tends to decrease with increasing speed which is an effect counter to the natural tendencies of a mechanical heterodyne of this type.

Specifically, in another preferred embodiment a gear 232 is rigidly attached to plate 241 eliminating the need for a substantially fixed internal ring gear such as 315. When fixed gear 232 is in mesh with gear 212 each having the same number of teeth and pitch diameter this in and of itself determines that eccentric masses 234 will counter rotations of the rotor substantially comprised of axle 214, and plates 240 and 241. If upon assembly the orientation vector of each of the eccentric masses are oriented for a positive heterodyne substantially at a right angle to the radius of the rotor which originates along the rotor central axis 214 and passes through the orbital body axis 222 then the heterodyne effect is fixed as a motor type and for a given rate of rotor rotation the degree of heterodyne becomes dependent upon the rate of rotation of the orbital body or bodies. In this alternative arrangement when gear 318 is clutched to the rotation of plate 216, or any other convenient rotor component, then the orbit body gear meshing with internal ring gear 318 will not turn with respect to the rotor and no heterodyne will occur. In this condition all elements of the rotor, orbital bodies, and eccentrics become rigid and locked and the entire assembly has only a single degree of freedom in that it may still rotate about the central axle 214. Conversely, in this alternative arrangement if gear 318 is clutched to the lack of rotation in motor housing or any convenient component of the fixed frame of reference then the rotation of the orbital bodies, rigidly attached to a gear such as 220 FIG. 3b will rotate with respect to the rotation of the rotor at a rate determined by the gear ratio between internal ring gear 318 and orbital body gear 220. This arrangement will then produce a maximum motor heterodyne for a given rotation rate of the rotor. By this means, throttling of the heterodyne torque produced can be selectively and controllably varied between a zero minimum and a rotationally determined maximum dependent only upon the rate of rotation of gear 318 and irregardless of whether this heterodyne effect is derived from the centrifugal effect caused by centripetal acceleration or heterodyne effect caused by the inability of an offset circular orbit to internally conserve momentum. Similarly, if a central spur gear such as 216 of FIG. 2 meshing with an orbital body gear such as 242 is clutched to plate 240 or the axle 214 it is typically journaled on or any other convenient rotor component, then the orbital body does not rotate and there is no heterodyne effect. If the same 216 is subsequently clutched to the motor housing, motor mount, or any other convenient component in the fixed frame of reference then the orbital body will rotate at a rate determined by the gear ration and the heterodyne effect will be at a maximum for a given rate of rotation of the main rotor.

Figure 3B:
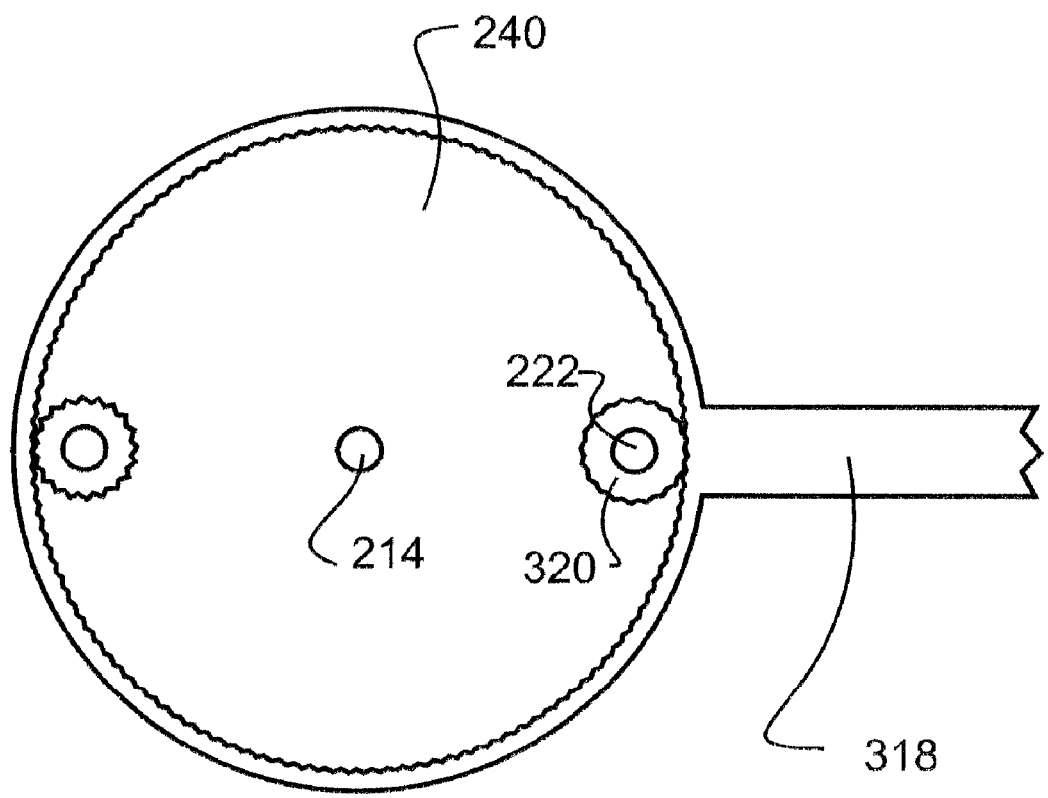
FIG. 3b illustrates the alternative embodiment manually regulated heterodyne mechanical motor of FIG. 3 by sectional view taken along line 3b'.

In FIG. 2, FIG. 3, and FIG. 3b the handle designated either 218 or 318 respectively can be literal, or exemplary. In this alternative embodiment due to the expectation that either central gear 216 or internal ring gear 318 will rotate rapidly the protruding handle should be considered as an example of a very large number of different means of handling rotation. Friction clutches and brakes, already mentioned are one class of mechanisms that are specifically designed to handle rotation. Electromagnetic clutches and brakes are examples of another class of such means. By extension, an electrical generator mechanically connected to either central gear 216 or internal ring gear 318 and electrically connected to an electric load could be seen as a braking the rotation of gear 216 or gear 318. This listing of broad classes of various means of handling, restraining, or causing rotation is merely indicative and is not exhaustive and should therefor in no way be considered a limitation on the scope of this invention.

Figure 4:
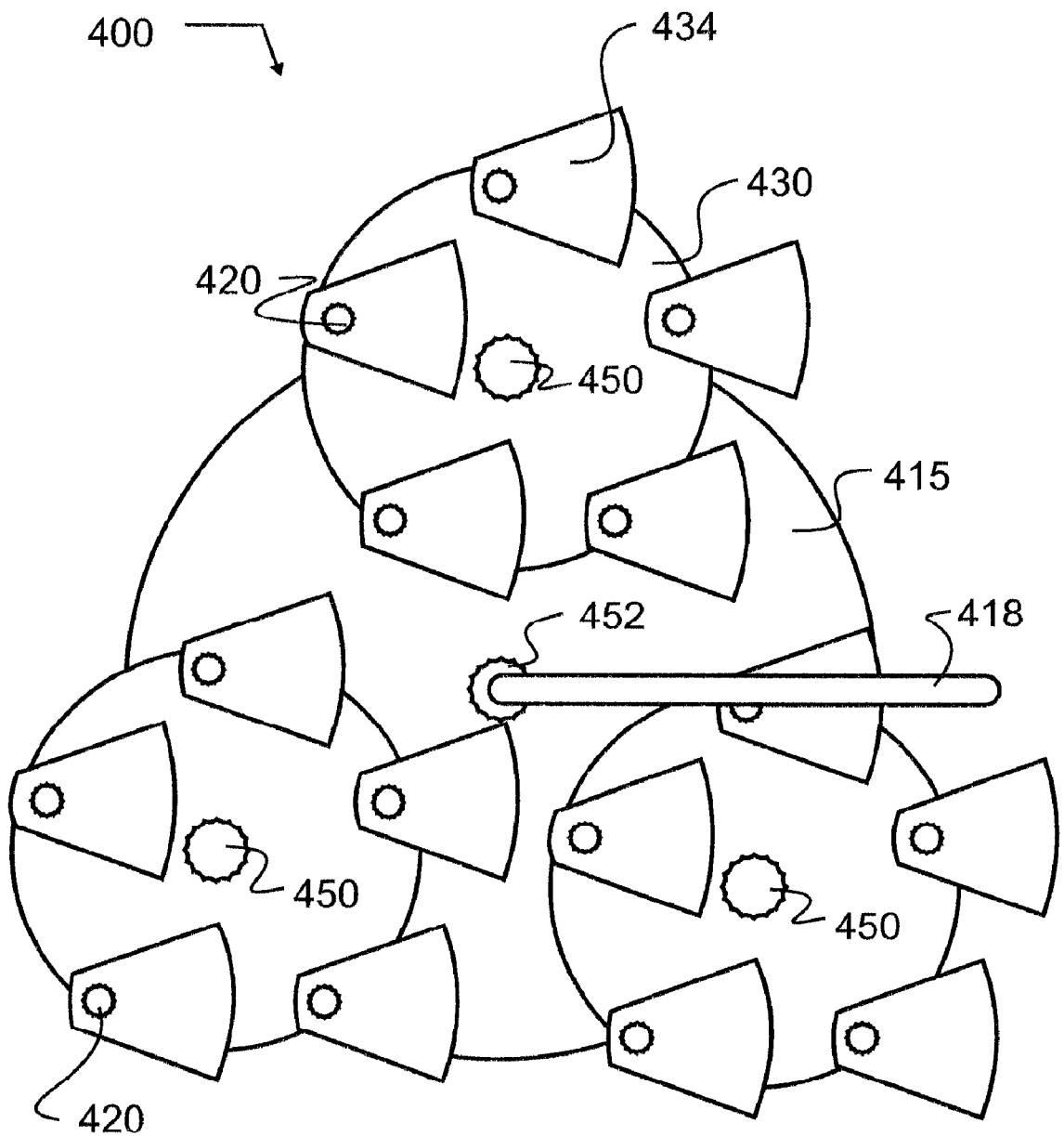
FIG. 4 illustrates a second alternative embodiment manually regulated heterodyne mechanical motor from end plan view.
Figure 5:
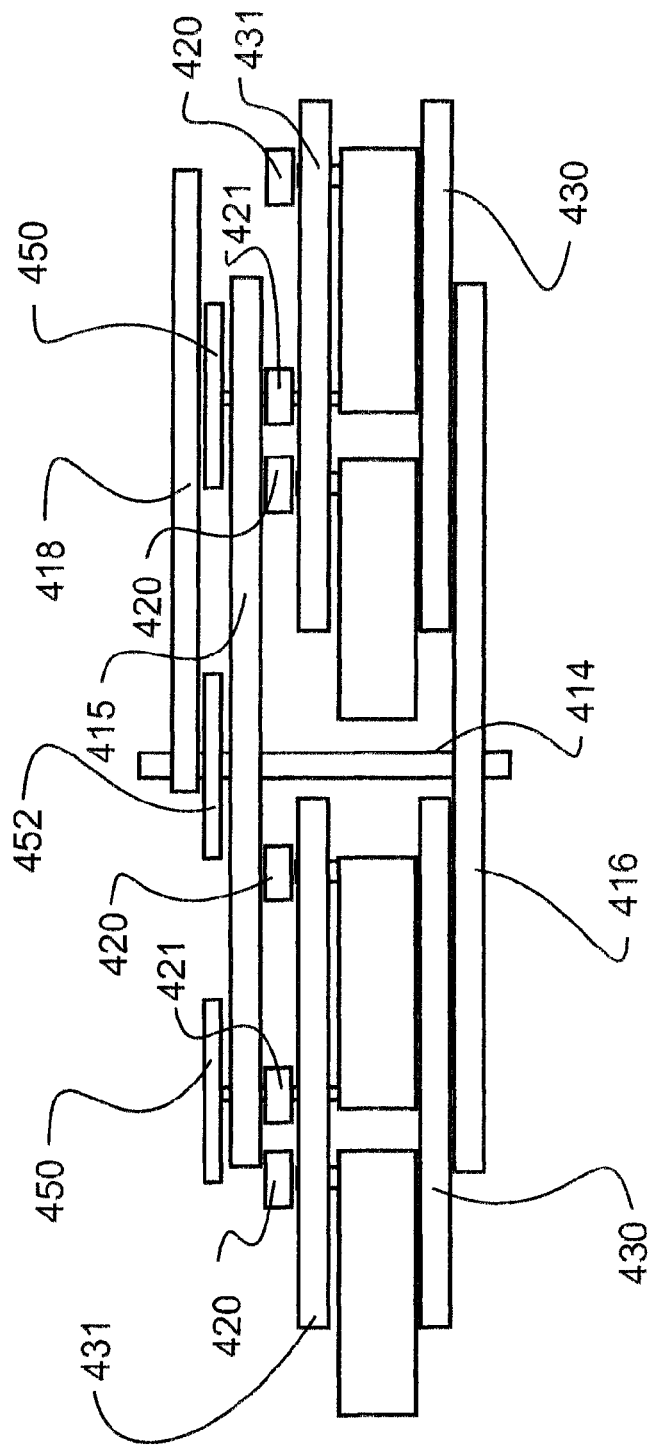
FIG. 5 illustrates the second alternative embodiment manually regulated heterodyne mechanical motor of FIG. 4 from side elevational view.

Another alternative embodiment manually regulated heterodyne mechanical motor is illustrated from end plan view in FIG. 4, and from side elevational view in FIG. 5, but with chains or belts removed therefrom to permit adequate illustration of this embodiment. As may be seen therein, a large number of eccentric masses 434 may be provided, demonstrating the flexibility of the present invention in incorporating one or many heterodyne bodies and eccentric masses into a single rotary machine. Each heterodyne body is substantially comprised of a pair of rotor plates 430, 431 that are transfixed by and rigidly coupled to orbital body axle 422, five (for the sake of illustration, but not limited thereto) eccentric masses 434 that each rotate about an axle 432 terminating on top with a sprocket, sheave or equivalent 420. The axle of each orbital body is journaled within an additional, sheave sprocket, or equivalent 421 rigidly fixed to plate 431. In this embodiment sprockets 420 are more distant from each other and central sprocket 421. This permits a belt, chain, or other flexible drive member to engage each of them. This may be a single serpentine belt or chain, or may alternatively be comprise a single belt or chain for each eccentric mass.

Central sheave, sprocket, or equivalent 452 is rigidly coupled with handle 418, and journaled about main rotor axle 414. Each orbital body is substantially comprised of sheave, sprocket or equivalent 450 rigidly attached to each orbital body axle which transfixes orbital body plate 430 and 431. In this preferred embodiment central sprocket 452 is engaged with each orbital body sprocket 450 by a belt, chain, or other flexible drive member. This may be a single serpentine belt or a single belt or chain for each orbital body.

Rotation of handle 418 will cause rotation of each gear 450, thereby rotating each orbital body. In addition, each gear 421 is rigidly coupled with rotor plate 415 such that rotation of handle 418 will also cause a differential rotation of each gear 420 and thereby re-orient each eccentric 434 as they orbit the rotor frame of reference defined by rotor axle 414 and the orbital body frame of reference defined by their orbital body axle and simultaneously rotate about their own axles 420. In this way, the angular orientation of each eccentric 434 with respect to ground or earth and thus the throttling, of heterodyne motor 400, may be varied through controlled rotation of handle 418.

In some select applications such as stationary propellers or fans in which the load may increase with the square of the rotational rate, a simple embodiment of this invention with a fixed ratio of r:R embodied in gears or a sprocket and chain drive can effectively drive the load at a relatively fixed rotational rate wherein the negative torque of the load and the positive torque of the heterodyne means are in a sustained equilibrium. The incorporation of a mechanical brake for stopping the system would then be the only regulatory mechanism required, although best practices may also dictate that the drive mechanism include a fusible link such as a chain or belt with a weak link or a shear pin mechanism combined with a centrifugal type brake or centrifugal link braking mechanism such as are common knowledge amongst those skilled in the art of mechanical design.

Similarly, in applications in which the load can be varied dynamically with regard to the torque produced by one of the means of this invention this condition may permit a substantially fixed regulation of the heterodyne means interacting with dynamic control of the variable load to fully regulate the heterodyne behavior of this means acting as in a motor driving an electrical generator or alternator. Centrifugal braking and or sacrificial drive components are preferably still incorporated into the system design, in order to mitigate the risk of an over running heterodyne motor.

In applications of electrical power generation wherein the mechanical load created by the generator or alternator is dynamically variable it may still be desirable that the output of the heterodyne means be dynamically variable. In this type of application best practices dictate that an electrical failure in neither the load nor the control create throttle conditions that allow over running to develop in the heterodyne means.

In all applications, systems to fail safe and prevent runaway conditions and further to contain the kinetic energies of any heterodyne means undergoing a structural failure should be included as needed.

Although this disclosure discusses the use of this invention as a dynamic brake, it also discloses that there are failure modes for the means that will cause the heterodyne to be broken and the braking effect to cease. Brake failure is a concern with all types of braking means, however, the failure modes for this heterodyne means make it typically preferable to utilize this heterodyne means primarily as a motor which may none the less incorporate some dynamic braking effects but not use this invention primarily as a braking means.

While the foregoing details what are felt to be the preferred and alternative embodiments of the invention, no material limitations to the scope of the claimed invention are intended. Further, features and design alternatives that would be obvious to one of ordinary skill in the art are considered to be incorporated herein. For exemplary purposes, a number of configurations using various counts of eccentrics and heterodyne bodies are illustrated. The exact number and arrangement will be determined by a designer in consideration of the application and the teachings provided herein. Similarly, a number of alternative gearing and flexible drive belts or chains have been illustrated, though many more have been proposed herein and contemplated and so are considered incorporated herein. As but one further example, various hydraulic systems are known to couple and transmit power which might alternatively be incorporated herein, or any other known and suitable couplings or transmission systems that are suitable for application to the present invention. These hydraulic systems might not only be gearing replacements, but might for exemplary purposes encompass the manual regulation described herein above. If, instead of the mechanically controlled ring gears illustrated herein above, the gear set was configured to pump hydraulic fluid, a stoppage of hydraulic fluid flow such as by the closure of a valve could then be used to alter or control the rotation of the gears, just as the handle on ring gear 318 does. One reasonably skilled in the art, upon reading the present disclosure, will recognize such functional equivalents, even where the structural components might visually differ significantly.

In addition, the present invention is not limited to one or a particular set of applications, and so instead may be used for various electrical machinery, novelty or educational toys illustrating moving machinery, and in any other environment where the unique structures and functions presented herein might have application. Transmission of power to and from the present invention is well known in the art of machines, and for exemplary purposes might include motors or generators driving or driven by the main shaft such as shafts 114, 214, 414, or might alternatively be coupled through other parts or components of the machines. In summary then, the scope of the invention is set forth and particularly described in the claims herein below.

I claim:
1. A heterodyne mechanical transmission, comprising:
   a first rotor;
   a main axis of rotation about which said first rotor operatively revolves;
   at least one orbital body;
   an orbital body support member which supports said at least one orbital body and which defines an orbital body axis of rotation about which said orbital body operatively revolves simultaneous with said first rotor operatively revolving and that is offset from said main axis of rotation, said orbital body support member coupled with said first rotor and rotating with said first rotor about said main axis of rotation;
   at least one eccentric mass;

an eccentric mass support member which supports said at least one eccentric mass and which defines an axis of rotation about which said eccentric mass operatively revolves simultaneous with said at least one orbital body revolving and that is offset from said main axis of rotation and offset from said orbital body axis of rotation, said eccentric mass support member coupled with said at least one orbital body and rotating with said at least one orbital body about said orbital body axis of rotation, said at least one eccentric mass having a center of mass therefor traveling in an eccentric orbit relative to said orbital body axis of rotation.

2. The heterodyne mechanical transmission of claim 1, further comprising an eccentric mass drive train engaging said eccentric mass with said orbital body support member and causing said eccentric mass to rotate about said eccentric mass axis of rotation at a fixed rate relative to a rate of rotation of said first rotor.

3. The heterodyne mechanical transmission of claim 1 further comprising an orbital body drive train engaging said orbital body and with said first rotor support member and causing said orbital body to rotate as it orbits about said main axis of rotation at a rate fixed relative to a rate of rotation of said first rotor.

4. The heterodyne mechanical transmission of claim 1, wherein said at least one orbital body further comprises at least two orbital bodies mass balanced about said first rotor.

5. The heterodyne mechanical transmission of claim 1, wherein said at least one eccentric mass further comprises at least two eccentric masses and having at least two eccentric mass support members evenly distributed about said orbital body and supporting said at least two eccentric masses.

6. The heterodyne mechanical transmission of claim 1, wherein said at least one eccentric mass counter rotates at a rate substantially equal to said first rotor rate of revolution.

7. A manually controlled heterodyne mechanical transmission, comprising:
a first rotor;
a main axis of rotation about which said first rotor revolves;
a first rotor support member;
at least one orbital body;
an orbital body support member which supports said at least one orbital body and which defines an orbital body axis of rotation about which said orbital body operatively revolves simultaneous with said first rotor operatively revolving and that is offset from said main axis of rotation, said orbital body support member coupled with said first rotor and rotating with said first rotor about said main axis of rotation;
at least one eccentric mass;
an eccentric mass support member which supports said at least one eccentric mass and which defines an axis of rotation about which said eccentric mass operatively revolves simultaneous with said at least one orbital body revolving and that is offset from said main axis of rotation and offset from said orbital body axis of rotation, said eccentric mass support member coupled with said at least one orbital body and rotating with said at least one orbital body about said orbital body axis of rotation, the inertial center of said at least one eccentric mass therefor traveling in a radially offset orbit relative to said orbital body axis of rotation;
an orientation vector of said eccentric mass which originates along said eccentric mass axis and terminates at the inertial center of said eccentric mass; and
at least one manual control for adjusting said eccentric mass orientation vector.

8. The manually controlled heterodyne mechanical transmission of claim 7, further comprising at least one throttling drive train which engages said at least one eccentric mass with a drive train member which does not rotate, excepting only a selected and controlled arc angle of rotation less than plus or minus 180 degrees of rotation and causing said at least one eccentric mass to counter rotate about said orbital body axis of rotation at a rate of rotation fixed relative to a rate of rotation of said first rotor plus or minus a selectable and controllable amount of rotation of said orientation vector of said eccentric mass axis.

9. The manually controlled heterodyne mechanical transmission of claim 7, further comprising at least one throttling drive train which engages said at least one orbital body with a drive train member which does not rotate, excepting only a selected and controlled arc angle of rotation less than plus or minus 180 degrees of rotation and causing said at least one eccentric mass to counter rotate about said orbital body axis of rotation at a rate of rotation fixed relative to a rate of rotation of said first rotor plus or minus a selectable and controllable amount of rotation of said orientation vector of said eccentric mass axis.

10. The manually controlled heterodyne mechanical transmission of claim 7, further comprising at least one throttling drive train member engaging said at least one eccentric mass with another drive train member which does not rotate, said engagement being of a selectable and controllable type via the action of a clutch or brake such that said at least one eccentric mass rotates at a fixed rate relative to a rate of rotation of said first rotor.

11. The manually controlled heterodyne mechanical transmission of claim 7, further comprising at least one throttling drive train member engaging said at least one orbital body with another drive train member which does not rotate, said engagement being of a selectable and controllable type such that said at least one orbital body rotates at a fixed rate relative to a rate of rotation of said first rotor.

12. The manually controlled heterodyne mechanical transmission of claim 7, further comprising at least one throttling drive train member engaging said at least one eccentric mass with another drive train member which does not rotate, said engagement being of a selectable and controllable type via the action of a dynamic brake such that said at least one eccentric mass rotates at a substantially fixed rate relative to a rate of rotation of said first rotor.

13. The manually controlled heterodyne mechanical transmission of claim 7, further comprising at least one throttling drive train member engaging said at least one orbital body with another drive train member which does not rotate, said engagement being of a selectable and controllable type via the action of a dynamic brake such that said at least one orbital body rotates at a substantially fixed rate relative to a rate of rotation of said first rotor.

14. The manually controlled heterodyne mechanical transmission of claim 7, further comprising at least two throttling drive train members engaging said at least one orbital body and also said at least one eccentric mass.

* * * * *